United States Patent Office 2,848,431
Patented Aug. 19, 1958

2,848,431

MODIFIED POLYCARBOXYLIC ACID-POLYMERIC POLYHYDRIC ALCOHOL RESINOUS PRODUCT

Russell T. Dean, Stamford, Conn., and Joseph P. Manasia, St. Albans, N. Y., assignors to Interchemical Corporation, New York, N. Y., a corporation of Ohio No Drawing. Application April 29, 1955
Serial No. 505,026

1 Claim. (Cl. 260—19)

This invention relates to new fatty oil acid modified alkyd resins and, more particularly, to such modified alkyds in which the conventionally used alkyd resin forming polyhydric alcohols have been replaced by a mixture of two different resinous materials containing hydroxyl groups.

We have discovered that new and useful resins are obtained by reacting phthalic anhydride, or other alkyd resin forming polycarboxylic acid, fatty oil acid, a polymeric polyhydric alcohol having alternating aliphatic chains and aromatic nuclei united through ether oxygen and containing 5 to 20 alcoholic hydroxyl groups per molecule, and a phenoxyethanol-formaldehyde condensate. In general, these resins have unusually good resistance to soap or alkali and are useful, especially in combinations with other film-forming resins, in protective and decorative coatings where alkali resistance or soap resistance is desirable. Certain of the resins are good emulsifying agents and are especially useful in producing stable water-in-oil emulsions for printing on textiles.

The new resins are prepared by first esterifying the fatty oil acid with the two hydroxyl containing resinous compounds and then reacting the phthalic anhydride, by esterification, with the resulting product. The reaction is continued until the desired acid value and viscosity are obtained. The reaction with phthalic anhydride is preferably carried out in solution in a volatile solvent such as xylol. Advantageously, the esterification is carried out by heating the reactants in the presence of volatile, water-immiscible, organic solvent as an azeotroping agent.

The phenoxyethanol-formaldehyde condensate used in the invention is formed by condensing phenoxyethanol with formaldehyde or a substance yielding formaldehyde, in substantially equal molecular proportions, by heating the reactants in the presence of an acid catalyst. The condensation is continued until a resin having a melting point of 75 or above can be isolated from the reaction mixture. The solid resin is isolated by neutralizing the reaction mixture with alkali, separating the solid resin and then drying it.

The polymeric polyhydric alcohols used in the invention are those made from 4,4'-dihydroxy diphenyl dimethyl methane or commercial mixtures of this 4,4'-isomer with lesser amounts of 2,2'- and 4,2'-isomers (i. e. Bisphenol A), and epichlorohydrin in the presence of alkali. Such products are commercially available, e. g. Epon resins and Araldite resins. Various resins of this type are available having 5 to 20 hydroxyl groups per molecule and having molecular weights on the order of 400 to 4000. Typical resins of this type are as follows:

Epon 1001, molecular weight approximately 900 and containing approximately 7 hydroxyl groups per molecule.
Epon 1004, molecular weight approximately 1400 and containing approximately 8 hydroxyl groups per molecule.
Epon 1007, molecular weight approximately 3000 and containing approximately 16 hydroxyl groups per molecule.
Epon 1009, molecular weight approximately 3750 and containing approximately 19 hydroxyl groups per molecule.

Fatty oil acids that can be used in the practice of the invention are those conventionally used in making alkyd resins, including dehydrated castor oil acids, soya fatty acids, linseed fatty acids, cottonseed oil fatty acids and the like. For best results the amount of fatty oil acid modification will be between 30 and 40% by weight based on total reactants, and the ratio of fatty oil acid to phthalic anhydride will preferably be on the order of 1 to 3 carboxyl equivalents of the fatty oil acid for each equivalent of phthalic anhydride.

The following examples will further illustrate the invention:

Example 1

| | Parts by weight |
|---|---|
| Epon 1001 | 10.80 |
| Acid catalyzed phenoxyethanol formaldehyde resin, M. P. 76° C. | 10.80 |
| Soya fatty acids | 14.30 |
| Phthalic anhydride | 2.86 |
| Xylene | 3.00 |

The first three reactants are heated at 470 to 482° F., until an acid number of less than 3 is obtained. The mixture is then cooled to 340° F., and the phthalic anhydride and the xylene are added. The mixture is then heated to 380 to 390° F. and maintained there until the desired degree of condensation is obtained, e. g. until viscosity of 30 poises or higher, as measured on a 50% solids solution in xylene, is obtained or until an acid value of the desired value is obtained. The phenoxy-ethanol-formaldehyde resin used in preparing the above resin is prepared by example, by reacting 91 parts phenoxyethanol with 21.8 parts Paraform (91% formaldehyde) in the presence of 1.4 parts of 16% aqueous solution of sulfuric acid, at 100 to 150° C. until the resin, after neutralization and drying, has a melting point of 75° or above.

Example 2

| | Parts by weight |
|---|---|
| Epon 1001 | 28.8 |
| Acid catalyzed phenoxyethanol-formaldehyde resin, M. P. 76° C. | 28.8 |
| Soya fatty acids | 34.4 |
| Phthalic anhydride | 4.0 |

The above ingredients were reacted to form a resin in a manner similar to that used in Example 1. The resin had an acid value of 2.4 as measured on a 60% solution in xylene.

Example 3

| | Parts by weight |
|---|---|
| Epon 1001 | 40.2 |
| Phenoxyethanol-formaldehyde resin, as in Example 1 | 19.8 |
| Soya fatty acids | 40.0 |
| Phthalic anhydride | 7.5 |

The above ingredients were reacted to a resin in a manner similar to that used in Example 1. The resin had an acid value of 15 as measured on a 65% solution of the resin in xylene.

Example 4

| | Parts by weight |
|---|---|
| Epon 1001 | 46.1 |
| Phenoxyethanol-formaldehyde resin, as in Example 1 | 11.5 |
| Soya fatty acids | 38.4 |
| Phthalic anhydride | 4.0 |

The above ingredients were reacted to form resin in a manner similar to Example 1. The resin had an acid value of 1.2 poises as measured on a 60.5% solution of the resin in xylene.

*Example 5*

| | Parts by weight |
|---|---|
| Epon 1001 | 45.0 |
| Phenoxyethanol-formaldehyde resin, as in Example 1 | 15.0 |
| Soya fatty acids | 40.0 |
| Phthalic anhydride | 7.5 |

The above reactants were reacted in accordance with the procedure of Example 1, to obtain a resin having an acid value of 14 as determnied on a 65% solution of the resin in xylene.

*Example 6*

| | Parts by weight |
|---|---|
| Epon 1001 | 11.2 |
| Phenoxyethanol-formaldehyde resin, M. P. 76° C., as in Example 1 | 44.8 |
| Soya fatty acids | 37.0 |
| Phthalic anhydride | 7.0 |

The above materials were reacted in a manner similar to that of Example 1 to obtain a resin having a viscosity of 1.36 poises, at 25° C., in 50% solution in xylene. The acid value of resin was 22.

*Example 7*

| | Parts by weight |
|---|---|
| Epon 1001 | 18.7 |
| Phenoxyethanol-formaldehyde resin, M. P. 76° C., as in Example 1 | 37.3 |
| Soya fatty acids | 37.0 |
| Phthalic anhydride | 7.0 |

The above materials were reacted in a manner similar to that of Example 1 to obtain a resin having a viscosity of 2.6 poises at 25° C. in 50% solution in xylene. The acid value of the resin was 21.8.

We claim:

Modified alkyd resins formed by reacting (A) an alkyd resin forming polycarboxylic acid with the reaction product of (B) fatty oil acid, (C) acid catalyzed phenoxyethanol-formaldehyde condensate having a melting point on the order of 75° C., and (D) a poylmeric polyhydric alcohol made by condensing dihydroxy diphenyl dimethyl methane with epichlorohydrin in the presence of alkali and having 5 to 20 hydroxyl groups per molecule and a molecular weight on the order of 400 to 4000.

References Cited in the file of this patent

UNITED STATES PATENTS

| 2,504,518 | Greenlee | Apr. 18, 1950 |
| 2,637,621 | Aver | May 5, 1953 |

FOREIGN PATENTS

| 364,042 | Germany | Nov. 16, 1922 |

OTHER REFERENCES

Brody, D. E.: Organic Finishing, 14, No. 9, pages 8 and 10 (1953). Copy in Scientific Library.